(12) United States Patent
Paulson et al.

(10) Patent No.: US 11,014,656 B2
(45) Date of Patent: May 25, 2021

(54) ZERO-FASTENER FLUSHMOUNT BALANCE WEIGHT SYSTEM PRESERVING ROTOR-BLADE TIP WITH INTEGRAL TUNING WEIGHT RETENTION FEATURE

(71) Applicant: Bell Helicopter Textron Inc., Fort Worth, TX (US)

(72) Inventors: Jared Mark Paulson, Fort Worth, TX (US); Bryan Marshall, Mansfield, TX (US); Christopher E. Foskey, Keller, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 523 days.

(21) Appl. No.: 15/627,819

(22) Filed: Jun. 20, 2017

(65) Prior Publication Data

US 2018/0362153 A1    Dec. 20, 2018

(51) Int. Cl.
*B64C 27/00*    (2006.01)
*B64C 27/473*    (2006.01)
(Continued)

(52) U.S. Cl.
CPC .......... *B64C 27/008* (2013.01); *B64C 11/008* (2013.01); *B64C 27/473* (2013.01);
(Continued)

(58) Field of Classification Search
CPC .............................. B64C 27/008; F03D 13/35
See application file for complete search history.

(56) References Cited

U.S. PATENT DOCUMENTS

| | | | | |
|---|---|---|---|---|
| 2,620,884 A | * | 12/1952 | Gluhareff | B64C 27/008 416/226 |
| 4,150,920 A | * | 4/1979 | Belko | B64C 27/473 416/145 |
| 6,196,066 B1 | | 3/2001 | Barbier | |

FOREIGN PATENT DOCUMENTS

| | | | | |
|---|---|---|---|---|
| DE | 4036708 A1 | * | 5/1992 | ........... B64C 27/008 |
| DE | 4036708 A1 | | 5/1992 | |

(Continued)

OTHER PUBLICATIONS

European Patent Office, European Search Report for EP Appl. No. 17201935.8 dated May 29, 2018, 4 pp.

(Continued)

*Primary Examiner* — Juan G Flores
(74) *Attorney, Agent, or Firm* — Daniel J. Chalker; Edwin S. Flores; Chalker Flores, LLP

(57) ABSTRACT

The present invention includes a balancing system that includes a weight box, mounted substantially within the rotor-blade spar, flush with a rotor-blade spar outer surface, operably accessible from a rotor-blade tip, and retained within the rotor-blade spar by a weight-box retention pin, one or more weight-box contact surfaces bonded to a rotor-blade-spar inner surface, or a weight-box lip providing a bearing contact with an edge of a spar rotor-blade spar cutout; and a weight package attached to the weight box, the weight package including a weight-box cover, two or more weight guide-rods attached to the weight-box cover, wherein one of the two or more weight guide-rods is positioned forward of a pitch change axis or center of twist and wherein one of the two weight guide-rods is positioned aft of the pitch change axis or center of twist, and one or more balance weights mounted on the weight guide-rods.

30 Claims, 18 Drawing Sheets

(51) Int. Cl.
    *B64C 27/82*         (2006.01)
    *F03D 13/35*         (2016.01)
    *B64C 11/00*         (2006.01)
    *F03D 1/06*           (2006.01)

(52) U.S. Cl.
    CPC .............. *B64C 27/82* (2013.01); *F03D 13/35* (2016.05); *F03D 1/0675* (2013.01)

(56) References Cited

FOREIGN PATENT DOCUMENTS

| | | |
|---|---|---|
| EP | 2711293 A2 | 3/2014 |
| FR | 078764 E | 9/1962 |

OTHER PUBLICATIONS

European Patent Office, Communication pursuant to Article 94(3) EPC for EP Appl. No. 17201935.8 dated Jun. 18, 2018, 7 pp.

* cited by examiner

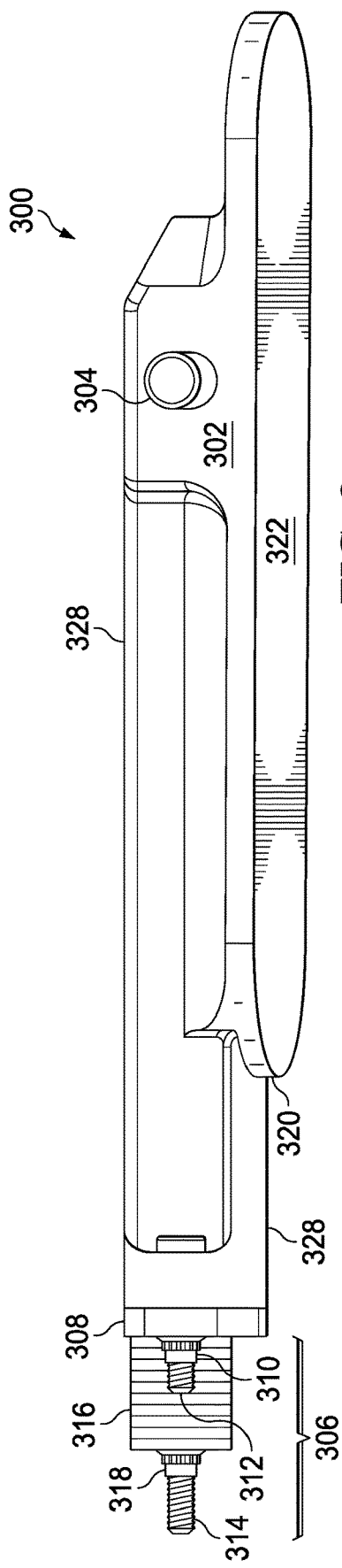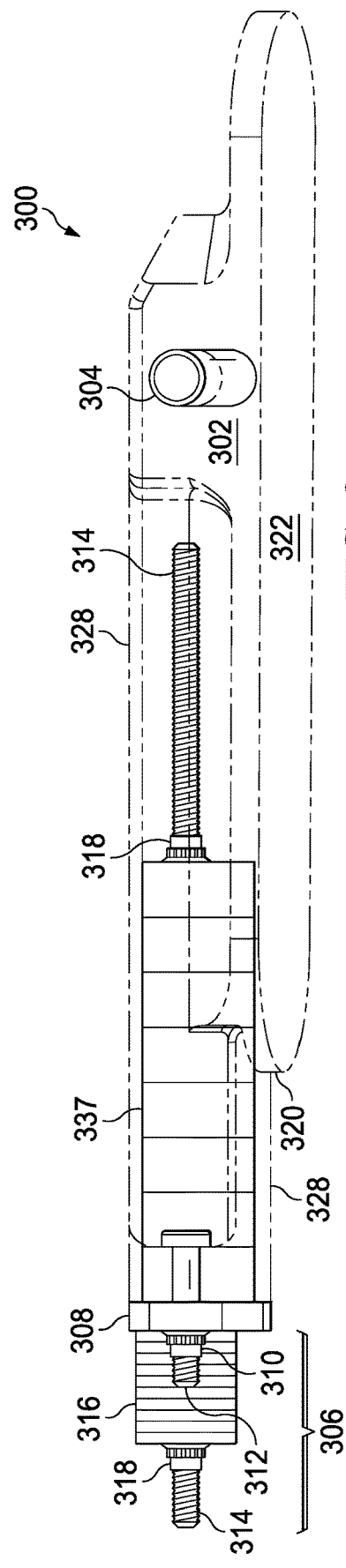

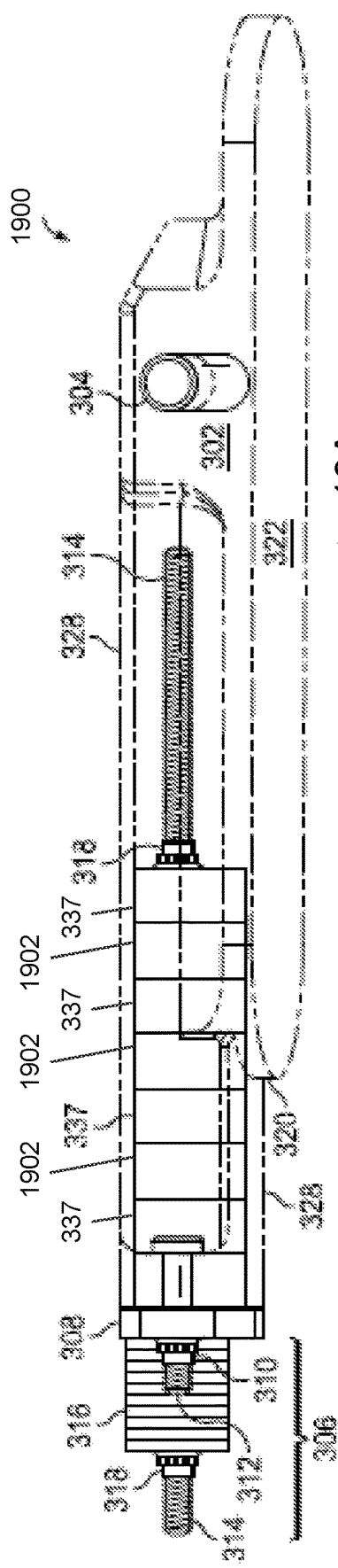
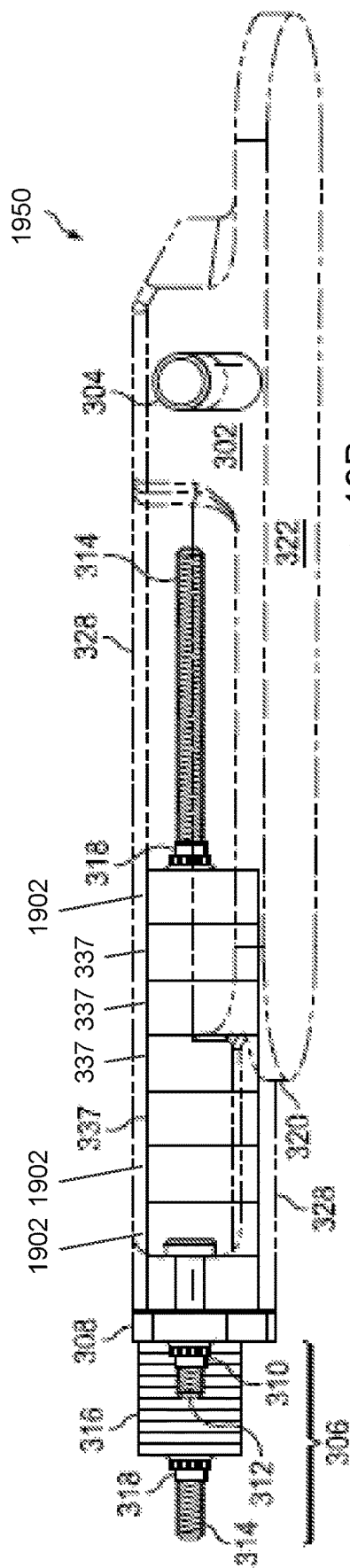
FIG. 19A
FIG. 19B

ZERO-FASTENER FLUSHMOUNT BALANCE WEIGHT SYSTEM PRESERVING ROTOR-BLADE TIP WITH INTEGRAL TUNING WEIGHT RETENTION FEATURE

CROSS-REFERENCE TO RELATED APPLICATIONS

None.

STATEMENT OF FEDERALLY FUNDED RESEARCH

None.

TECHNICAL FIELD OF THE INVENTION

The present invention relates in general to the field of balancing rotor blades and rotor in aircraft, and more particularly, to a novel system for balancing rotor blades and rotor systems.

BACKGROUND OF THE INVENTION

Without limiting the scope of the invention, its background is described in connection with balancing rotor blades and rotor systems in rotorcraft.

One example of an aircraft is a rotorcraft. A rotorcraft may include a main rotor system, a tail rotor system, or a proprotor system, each including a plurality of rotor blades. Each rotor system and each rotor blade must be balanced by the selection and placement of balance weights within the rotor blades.

Rotor systems typically require span balancing, and individual rotor blades within rotor systems typically require chord balancing. Span balancing and chord balancing are typically accomplished by the placement of weights within individual rotors. Such balancing can be accomplished in large part by static balancing: the distribution of relatively large weights that can be installed such that they do not have to be accessed frequently, because these balance requirements do not change rapidly. However, wear, repair, and maintenance of rotor blades typically introduce small changes that require dynamic balancing: the distribution and relatively frequent adjustment of relatively small weights as part of rotor maintenance, thus requiring easy, frequent access to the weights used. Existing methods and apparatuses for balancing rotor systems and rotor blades typically include a pocket machined into a rotor blade, into which balance weights are placed, with a cover fastened over the pocket, or a hole through blade components on one surface of the blade, with a cover to which balance weights are attached and which is fastened to cover the hole. Fasteners through a blade surface are often initiation points for surface wear, causing erosion. Weight package covers are difficult to make flush with the surrounding contoured rotor blade surface. Such mismatches expose the edges of weight package covers, negatively affecting the aerodynamic performance of the blade. Further, the exposed edges can cause premature wear to the blade surface.

Other existing methods and apparatuses for balancing rotor systems and rotor blades use weight packages installed from tips of blades. However, these methods and apparatuses are intended to be adjusted rarely or not at all, and such adjustments are difficult. The weights used are typically fastened to the surface of the blade for retention. Where the blade surface includes electrical heating elements, metal abrasion strips, or erosions caps through which holes must be made to retain such weight packages, these methods and apparatuses are disadvantageous. Among other problems, cracks can form at the holes.

The effects of these existing methods and apparatuses incur operations and maintenance costs and decrease safety. Methods and apparatuses for balancing rotor systems and rotor blades without covers and fasteners on blade surfaces are desirable.

SUMMARY OF THE INVENTION

In one embodiment, the present invention includes a balancing system, including: a weight box, the weight box including a weight-box retention pin, the weight box mounted substantially within a rotor-blade spar, flush with a spar outer surface of the rotor-blade spar, operably accessible from a rotor-blade tip, and retained within the rotor-blade spar by: a weight-box retention pin inserted through a forward wall of the rotor-blade spar, the weight box, and an aft wall of the rotor-blade spar; one or more weight-box contact surfaces bonded to an upper inner surface of the rotor-blade spar or a lower inner surface of the rotor-blade spar; or a weight-box lip positioned to provide a bearing contact with an edge of a spar cutout of the rotor-blade spar; and a weight package attached to the weight box, the weight package including: a weight-box cover attached to the weight box; two or more weight guide-rods attached to the weight-box cover, wherein one of the two or more weight guide-rods is positioned forward of a pitch change axis or a center of twist and wherein one of the two or more weight guide-rods is positioned aft of the pitch change axis or the center of twist; and one or more balance weights mounted on at least one of the two or more weight guide-rods. In one aspect, the system further includes one or more weight-retention devices mounted on at least one of the two or more weight guide-rods to retain the one or more balance weights on the at least one of the two or more weight guide-rods. In another aspect, the one or more weight-retention devices have anti-rotation features or are operably configured to be interference-fit to the one or more balance weights. In another aspect, the system further one or more pin spacers positioned near the weight-box retention pin and between the forward wall of the rotor-blade spar and the weight-box or the aft wall of the rotor-blade spar and the weight box. In another aspect, the weight-box cover is attached to the weight box with one or more weight-package retention devices. In another aspect, the one or more weight-package retention devices have anti-rotation features or are operably configured to be interference-fit to the weight-box cover. In another aspect, the two or more weight guide-rods have anti-rotation features to prevent rotation relative to the weight-box cover. In another aspect, the two or more weight guide-rods, each weight guide-rod having a threaded tip portion and a non-threaded shank portion or is threaded for substantially its entire length. In another aspect, the one or more balance weights include one or more span-balance weights or one or more dynamic-balance weights. In another aspect, the one or more span-balance weights are mounted on the two or more weight guide-rods on an inboard side of the weight-box cover. In another aspect, the one or more span-balance weights are shaped to substantially fill an interior space of the weight box from a weight-box upper inner surface to a weight-box lower inner surface and from a weight-box forward inner surface to a weight-box aft inner surface. In another aspect, the one or more dynamic-balance weights are mounted on the two or more weight guide-rods on an outboard side of the weight-box cover. In another aspect, the weight package further includes one or more lightweight spacers mounted on at least one of the two or more weight guide-rods. In another aspect, the one or more balance weights are operably configurable to substantially provide span balance or chord balance. In another aspect, the weight-box retention pin locates or retains a leading-edge tuning weight. In another aspect, wherein the weight-box retention pin locates a blade core. In another aspect, the rotor-blade spar is a main rotor-blade spar, a tail rotor-blade spar, a proprotor blade spar, a propeller blade spar, or a wind-turbine blade spar.

In another embodiment, the present invention includes a rotor system, including: at least one rotor blade; a rotor-blade spar inside the at least one rotor blade; a weight box, the weight box including a weight-box retention pin, the weight box mounted substantially within the rotor-blade spar, flush with a spar outer surface of the rotor-blade spar, operably accessible from a rotor-blade tip, and retained within the rotor-blade spar by: the weight-box retention pin inserted through a forward wall of the rotor-blade spar, the weight box, and an aft wall of the rotor-blade spar; one or more weight-box contact surfaces bonded to an upper inner surface of the rotor-blade spar or a lower inner surface of the rotor-blade spar; or a weight-box lip positioned to provide a bearing contact with an edge of a spar cutout of the rotor-blade spar; and a weight package attached to the weight box, the weight package including: a weight-box cover attached to the weight box; two or more weight guide-rods attached to the weight-box cover, wherein one of the two or more weight guide-rods is positioned forward of a pitch change axis or a center of twist and wherein one of the two or more weight guide-rods is positioned aft of the pitch change axis or the center of twist; and one or more balance weights mounted on at least one of the two or more weight guide-rods. In one aspect, the rotor system further includes one or more weight-retention devices mounted on at least one of the two or more weight guide-rods to retain the one or more balance weights on the at least one of the two or more weight guide-rods.

In yet another embodiment, the present invention includes a method of balancing weights in a rotor system, including: inserting a weight box substantially within a rotor-blade spar of a rotor blade, flush with a spar outer surface of the rotor-blade spar, and operably accessible from a rotor-blade tip; retaining the weight box within the rotor-blade spar by: bonding one or more weight-box contact surfaces to an upper inner surface of the rotor-blade spar or a lower inner surface of the rotor-blade spar; using a bearing contact between a weight-box lip of the weight box and an edge of a spar cutout; or inserting a weight-box retention pin through a forward wall of the rotor-blade spar, the weight box, and an aft wall of the rotor-blade spar; arranging one or more balance weights in a weight package; retaining the one or more balance weights in the weight package; and attaching the weight package to the weight box. In one aspect, the weight package includes a weight-box cover; and the arranging the one or more balance weights in the weight package further includes: attaching two or more weight guide-rods to the weight-box cover, attaching one of the two or more weight guide-rods forward of a pitch change axis or a center of twist and attaching one of the two or more weight guide-rods aft of the pitch change axis or the center of twist; and arranging the one or more balance weights on the two or more weight guide-rods. In another aspect, two or more weight guide-rods have anti-rotation features to prevent rotation relative to the weight-box cover. In another aspect, the method further includes arranging the one or more balance weights, wherein the one or more balance weights include one or more span-balance weights. In another aspect, the method further includes arranging the one or more balance weights, wherein the one or more balance weights include one or more dynamic-balance weights. In another aspect, the method further includes retaining the one or more balance weights in the weight package with one or more retention devices having anti-rotation features or operably configured to be interference-fit to the one or more balance weights. In another aspect, the method further includes attaching the weight package to the weight box with one or more retention devices having anti-rotation features or operably configured to be interference-fit to the weight package. In another aspect, the arranging the one or more balance weights in the weight package includes arranging the one or more balance weights for span balancing the rotor system or arranging the one or more balance weights for chord balancing the rotor blade. In another aspect, the method further includes locating or retaining a leading-edge tuning weight with the weight-box retention pin. In another aspect, the method further includes locating a blade core with the weight-box retention pin. In another aspect, the method further includes inserting the weight box and the weight package substantially inside the rotor-blade spar, wherein the rotor-blade spar is a main rotor-blade spar, a tail rotor-blade spar, a proprotor blade spar, a propeller blade spar, or a wind-turbine blade spar.

In yet another embodiment, the present invention includes a rotorcraft, including: a fuselage; one or more engines coupled to the fuselage; and one or more rotor systems coupled to the one or more engines, each rotor system of the one or more rotor systems including at least one rotor blade including: a rotor-blade spar inside the at least one rotor blade; a weight box, the weight box including a weight-box retention pin, the weight box mounted substantially within the rotor-blade spar, flush with a spar outer surface of the rotor-blade spar, operably accessible from a rotor-blade tip, and retained within the rotor-blade spar by: the weight-box retention pin inserted through a forward wall of the rotor-blade spar, the weight box, and an aft wall of the rotor-blade spar; one or more weight-box contact surfaces bonded to an upper inner surface of the rotor-blade spar or a lower inner surface of the rotor-blade spar; a weight-box lip positioned to provide a bearing contact with an edge of a spar cutout of the rotor-blade spar; and a weight package attached to the weight box, the weight package including a weight-box cover attached to the weight box; two or more weight guide-rods attached to the weight-box cover, wherein one of the two or more weight guide-rods is positioned forward of a pitch change axis or a center of twist and wherein one of the two or more weight guide-rods is positioned aft of the pitch change axis or the center of twist; and one or more balance weights mounted on at least one of the two or more weight guide-rods. In one aspect, the rotorcraft further includes one or more weight-retention devices mounted on at least one of the two or more weight guide-rods to retain the one or more balance weights on the at least one of the two or more weight guide-rods.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which:

FIG. 8 shows a side view of an embodiment of the present invention, including a weight box, weight-box contact surfaces, a weight package, a weight-box cover, and dynamic-balance weights;

FIG. 9 shows a side view of an embodiment of the present invention including a weight box, weight-box contact surfaces, a weight package, a weight-box cover, dynamic-balance weights, and span-balance weights;

FIGS. 19A-19B show side views of an embodiment of the present invention including a weight box, weight-box contact surfaces, a weight package, a weight-box cover, dynamic-balance weights, span-balance weights, and lightweight span-balance weights.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
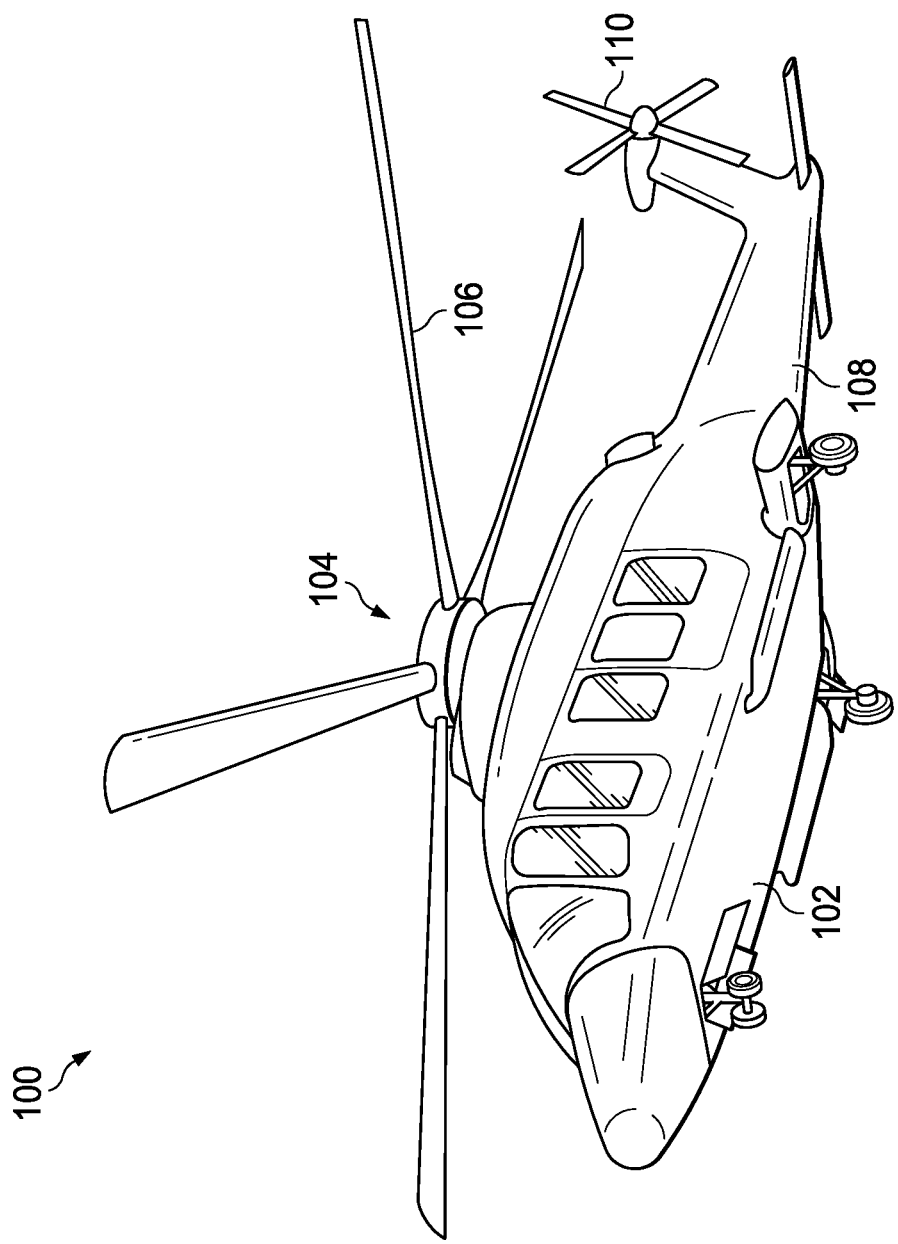
FIG. 1 shows a side view of a helicopter according to a particular embodiment of the present invention.

FIG. 1 shows an aircraft 100 in accordance with a particular embodiment of the present application. In the exemplary embodiment, aircraft 100 has a fuselage 102 and a rotor system 104 carried thereon. A plurality of rotor blades 106 is operably associated with a rotor system 104 for creating flight. A tail boom 108 is depicted that further includes tail rotor 110.

Figure 2:
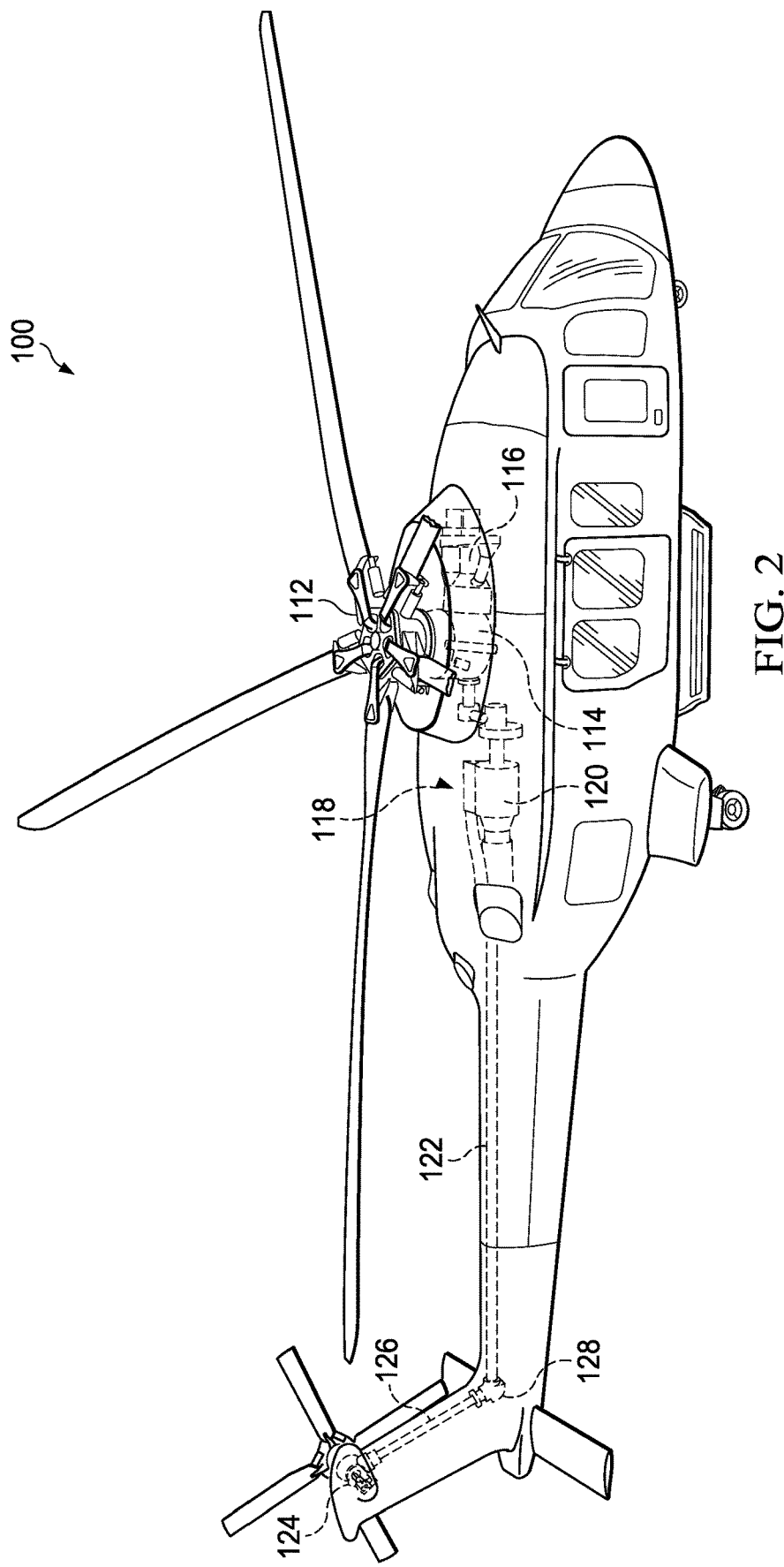
FIG. 2 shows a partial cross-section, perspective view of a helicopter according to an embodiment of the present invention.

For example, FIG. 2 shows a partial cross-section, perspective view of aircraft 100 that includes additional detail of an embodiment of the present invention. Aircraft 100 further includes a rotor mast 112, which is connected to the main rotor gearbox 114. The main rotor gearbox 114 is connected to one or more accessory gear boxes 116. The engine compartment 118 contains engine 120 and the main rotor gearbox 114 is connected to engine 120. A tail boom drive shaft 122 transmits mechanical rotation to the tail rotor gear box 124, which is connected via tail rotor drive shaft 126, via intermediate gear box 128.

Figure 3:
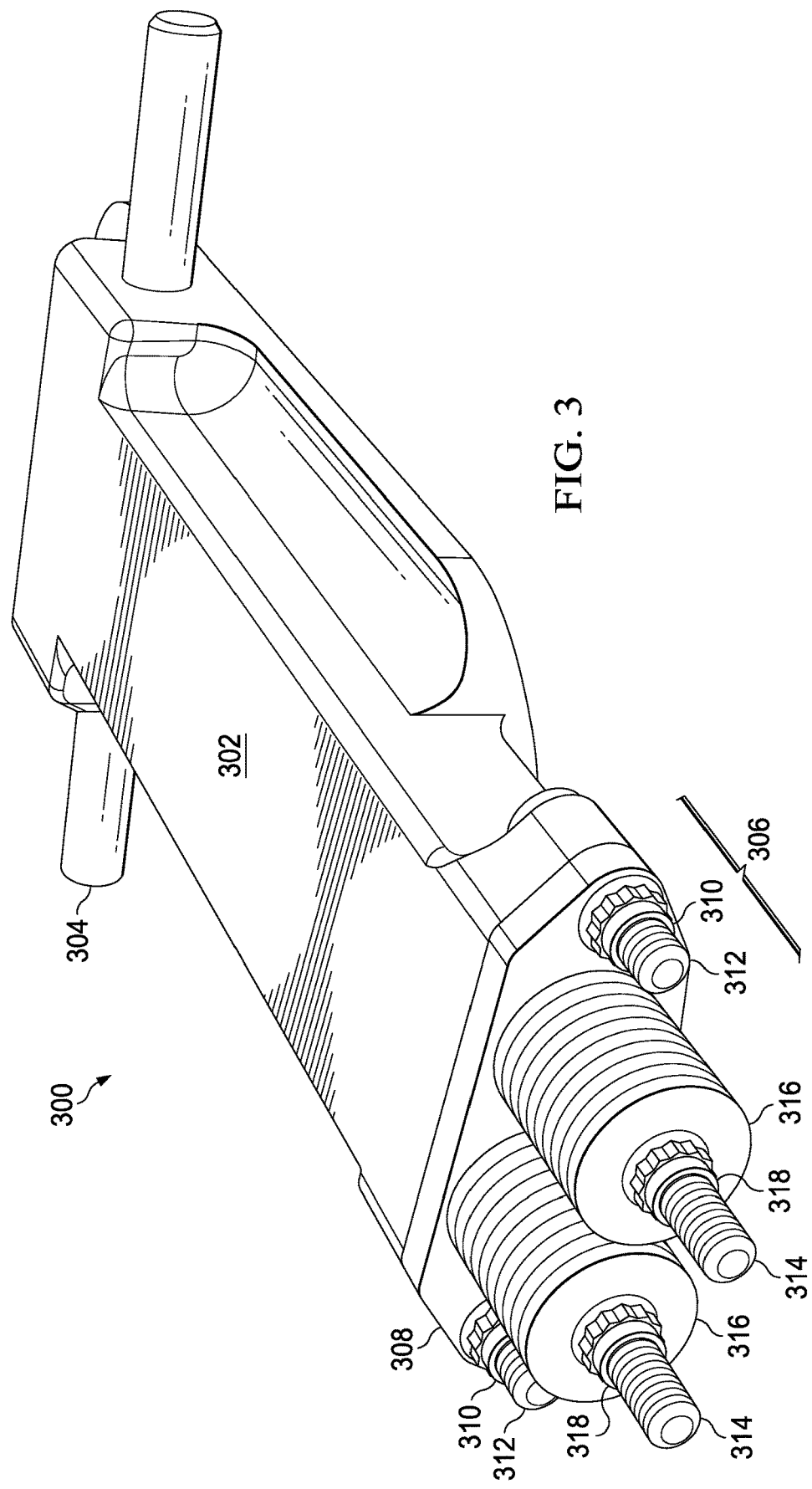
FIG. 3 shows a perspective view of an embodiment of the present invention, including a weight box, a weight-box retention pin, a weight package, and dynamic-balance weights.

FIG. 3 shows a perspective view of an embodiment of the present invention. In the embodiment shown, balancing system 300 is to be installed in rotor blade 106. As illustrated, rotor blade 106 is a main-rotor blade, but in other embodiments of the invention, balancing system 300 may be used with a tail-rotor blade, a proprotor blade, a propeller blade in a propeller system, a wind-turbine blade, or another type of blade. Balancing system 300 includes weight box 302, which further includes weight-box retention pin 304. Weight-box retention pin 304 may be bonded or fixed in place, and it may provide a feature with which to locate a blade core (see FIGS. 7, 14, and 15) and with which to locate and retain a rotor-blade leading edge tuning weight for dynamic tuning and for weight and mass balance (see FIGS. 7, 14, and 15). Balancing system 300 also includes weight package 306. Weight package 306 includes weight-box cover 308 and weight-package retention devices 310, which are used to attach weight package 306 to weight box 302 at weight-package retention rods 312. Weight-package retention devices 310 may include nuts, washers, and/or other common fastening devices. Weight package 306 also includes weight guide-rods 314, which are attached to weight-box cover 308 and extend out from weight-box cover 308 on both its inboard and outboard sides. Weight guide-rods 314 have anti-rotation features to prevent rotation relative to weight-box cover 308. One of the two or more weight guide-rods 314 is positioned such that it is forward of the pitch change axis and of the center of twist of rotor blade 106 when balancing system 300 is installed, and one of the two or more weight guide-rods 314 is positioned aft of the pitch change axis and of the center of twist of rotor blade 106. Positioning weight guide-rods 314 in this way permits biasing of balance weights to adjust blade-chord balance. Each weight guide-rod 314 may have a threaded tip portion and a non-threaded shank portion or may be threaded for substantially its entire length. Weight-package retention devices 310 have anti-rotation features or are operably configured to be interference-fit to weight-box cover 308. Weight package 306 also includes one or more balance weights, which are mounted on at least one of the weight guide-rods 314. The balance weights shown are dynamic-balance weights 316. Span-balance weights are not shown in FIG. 3. The dynamic-balance weights 316 are mounted on the weight guide-rods 314 on the outboard side to weight-box cover 308, and retained on the weight guide-rods 314 with weight-retention devices 318. Weight-retention devices 318 have anti-rotation features or are operably configured to be interference-fit to the one or more dynamic-balance weights 316. Weight-retention devices 318 may include nuts, washers, and/or other common fastening devices. Weight package 306 may also include one or more lightweight spacers 1902 (see FIGS. 19A-B]) mounted on at least one weight guide-rod 314, to take up space if necessary, depending on the design of weight guide-rods 314 or the distribution of balance weights among weight guide-rods 314.

Continuing reference to FIG. 3, the embodiment depicted, and other embodiments depicted herein that are similarly oriented, is designed to be installed in the lower surface of rotor blade 106. One skilled in the art will recognize that the invention described herein may be installed in either surface of a blade.

Figure 4:
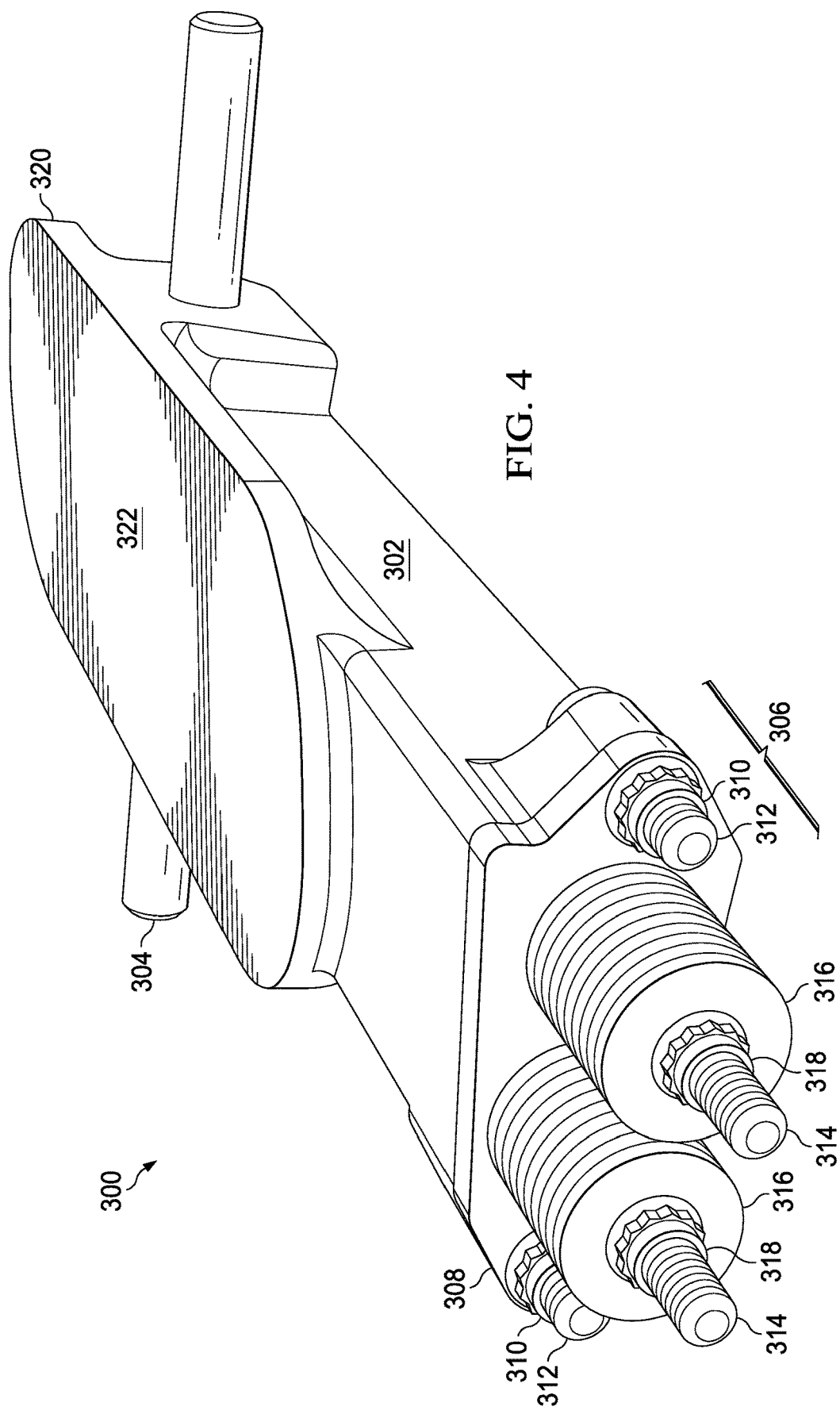
FIG. 4 shows a perspective view of an embodiment of the present invention, including a weight box, a weight-box retention pin, a weight package, and dynamic-balance weights.

FIG. 4 shows a perspective view of part of an embodiment of the invention. The balancing system 300 is shown with weight box 302 and weight package 306. Weight box 302 includes weight-box retention pin 304, and weight package 306 includes weight-box cover 308, weight-package retention devices 310, weight-package retention rods 312, two or more weight guide-rods 314, one or more dynamic-balance weights 316, and weight-retention devices 318. Further, weight-box lip 320 of weight box 302, the lateral rim of the lower part of weight box 302, is shown. Weight-box outer surface 322, the slightly contoured but relatively flat lower part of weight box 302 that is flush with an outer surface of rotor-blade spar 324 (not shown) when balancing system 300 is installed, is also shown.

Figure 5:
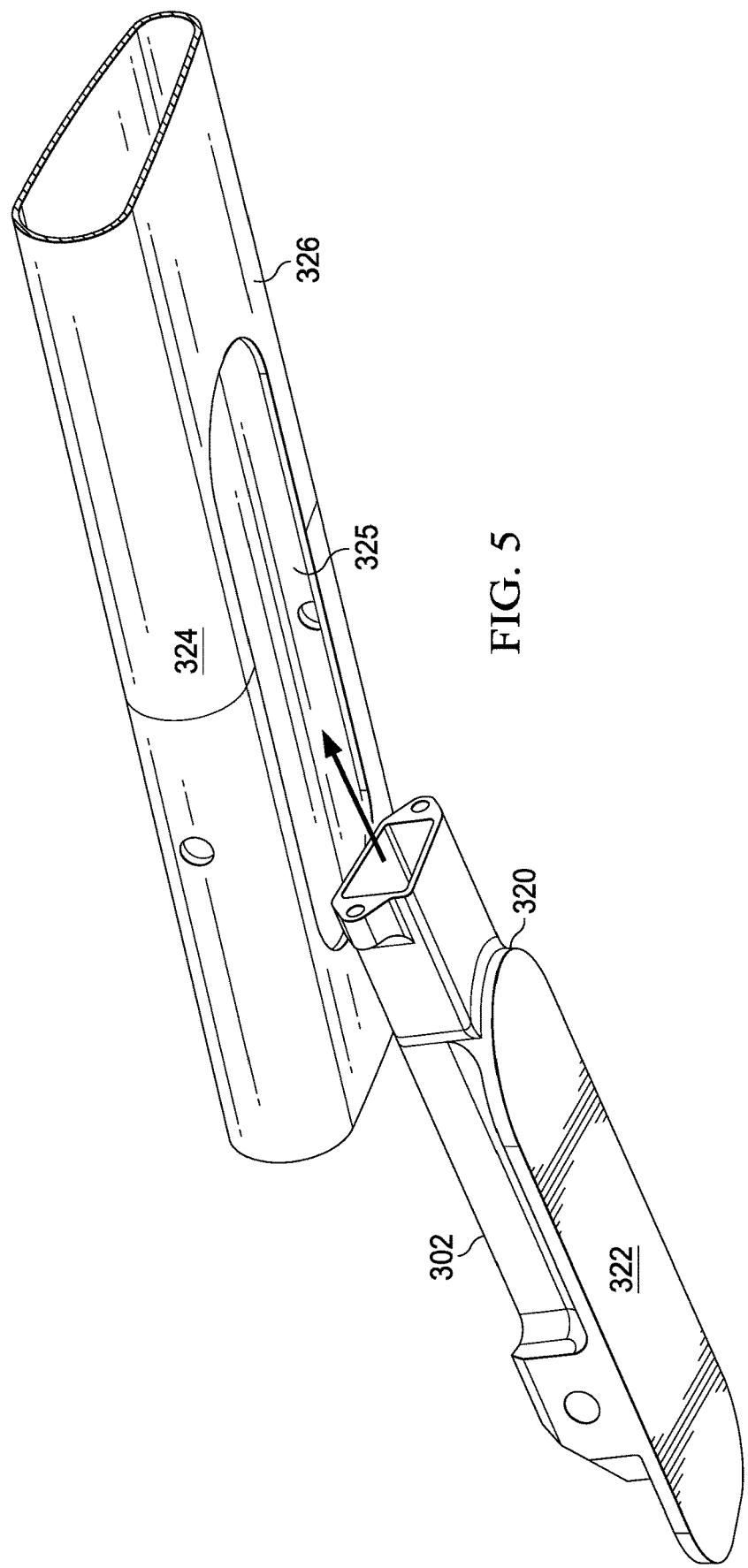
FIG. 5 shows a perspective view of an embodiment of the present invention including a weight box and a rotor-blade spar into which it is to be mounted through a spar cutout.

FIG. 5 shows a perspective view of part of an embodiment of the invention. Weight box 302 is to be mounted substantially within rotor-blade spar 324. As illustrated, rotor-blade spar 324 is a spar in a main-rotor blade 106, but in other embodiments of the invention, balancing system 300 may be used with a tail rotor-blade spar, a proprotor blade spar, a propeller blade spar in a propeller system, a wind-turbine blade spar, or another type of blade spar. Weight box 302 is shown, with weight-box lip 320 and weight-box outer surface 322 visible, positioned for insertion into a rotor-blade spar 324 through spar cutout 325 in spar outer surface 326 of rotor-blade spar 324. The intended insertion of weight box 302 is indicated by the arrow from weight box 302 toward spar cutout 325.

Figure 6:
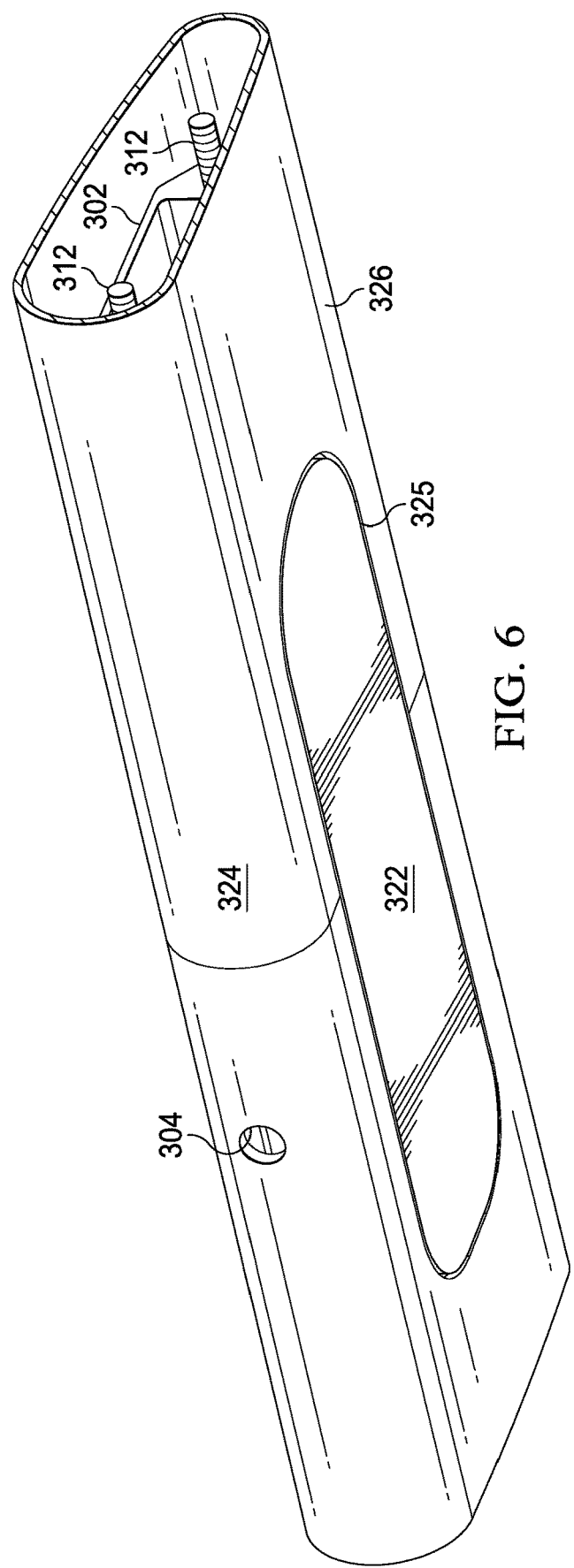
FIG. 6 shows a perspective view of an embodiment of the present invention; including a weight box mounted in a rotor-blade spar through a spar cutout.

FIG. 6 shows a perspective view of part of an embodiment of the invention herein. Weight box 302 is shown after insertion through spar cutout 325 in spar outer surface 326 of rotor-blade spar 324. Weight box 302 substantially fills the interior of rotor-blade spar 324 from the upper to the lower inner surfaces. Once mounted substantially within rotor-blade spar 324, weight box 302 is exposed through spar cutout 325 and the weight-box outer surface 322 of weight box 302 is flush with spar outer surface 326 of the rotor-blade spar 324. An end of weight-box retention pin 304, an end of weight box 302, and weight-package retention rods 312 are visible in this illustration. Weight box 302 is retained within rotor-blade spar 324 by (1) a weight-box retention pin 304 inserted through a forward wall of the rotor-blade spar 324, the weight box 302, and an aft wall of the rotor-blade spar 324; (2) one or more weight-box contact surfaces 328 (not shown) bonded to an upper inner surface of the rotor-blade spar or a lower inner surface of the rotor-blade spar 324; or (3) a weight-box lip 320 positioned to provide a bearing contact with an edge of a spar cutout 325. Any one of these retention modes may be used, or any two or all three of them may be used at the same time. No fasteners such as screws, nuts, or bolts are used to retain weight box 302 within rotor-blade spar 324.

Figure 7:
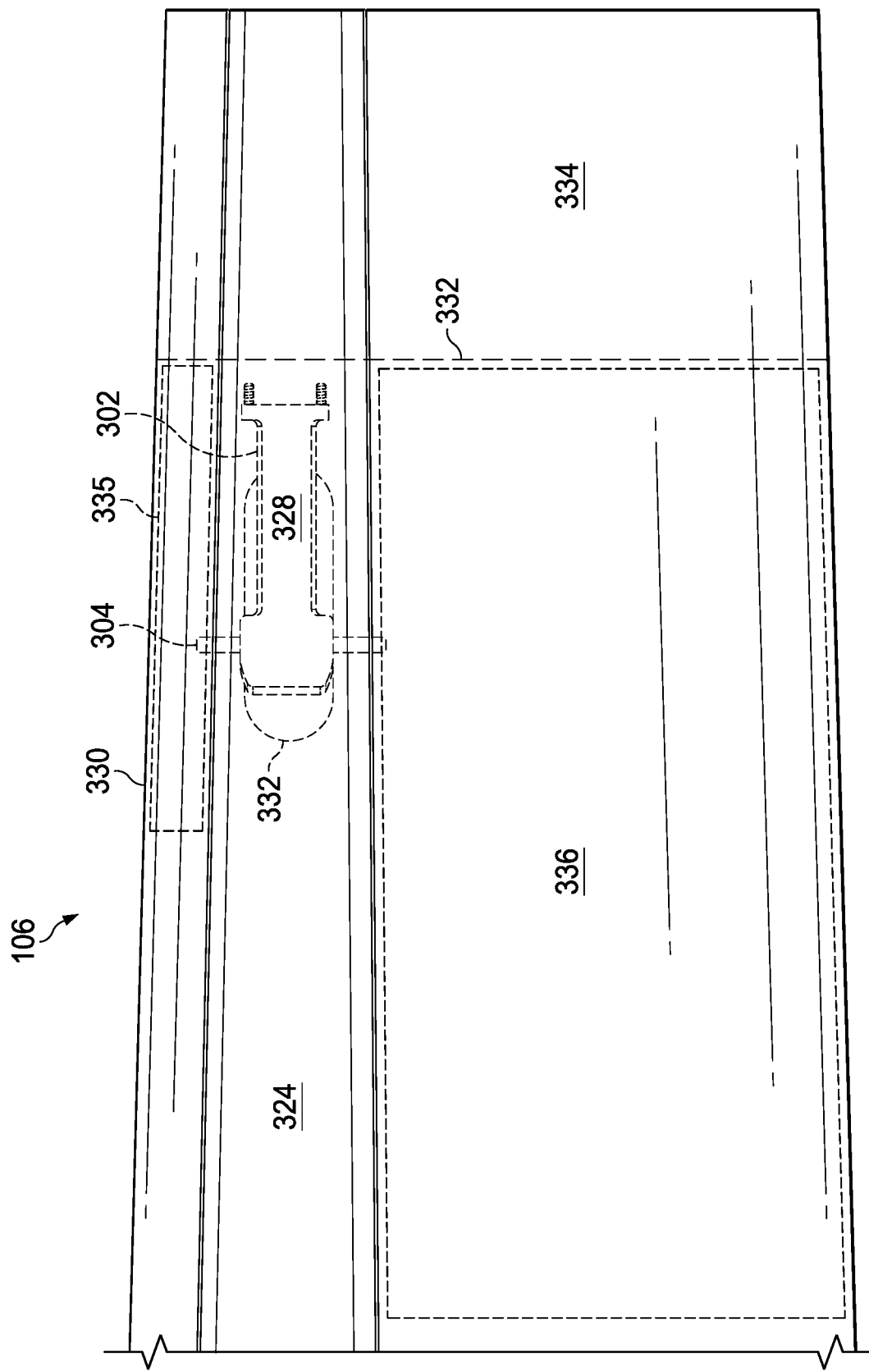
FIG. 7 shows a plan view of an embodiment of the present invention, including a weight box mounted in a rotor-blade spar.

FIG. 7 shows a plan view of an embodiment of part of the present invention. Weight box 302 with weight-box retention pin 304 is shown installed in rotor-blade spar 324 of rotor blade 106 from the upper side of rotor blade 106. FIG. 7 illustrates the position of weight box 302 within rotor blade 106 relative to the leading edge 330 of rotor blade 106 and relative to rotor-blade tip 332 of rotor blade 106. Weight-box contact surface 328 is shown. Weight box 302 is positioned within rotor-blade spar 324 such that it is operably accessible from rotor-blade tip 332. As illustrated, blade excess 334 is used for test coupons and is ultimately cut off of rotor blade 106 for flight operations. FIG. 7 also illustrates leading-edge tuning weight 335 and blade core 336. As illustrated, weight-box retention pin is being used to locate and retain leading-edge tuning weight 335 and to locate blade core 336.

As may be seen from FIGS. 3, 4, 5, 6, and 7, those figures and the figures that follow herein illustrate embodiments of the present invention in which, generally, rotor-blade balance weights, such as dynamic-balance weights 316, are inserted in a cured spar such as rotor-blade spar 324 and then covered over with blade components at blade assembly. This traps the apparatus containing the weights, such as balancing system 300, preventing it from coming loose in the rotor blade, such as rotor blade 106. The rotor-blade tip 332 is preserved for use for test coupons. The present invention avoids making holes in electrical heating elements, metal abrasion strips, or erosions caps, aside from rotor-blade spar 324. Further, bonding weight box 302 to rotor-blade spar 324 yields a higher reliability of bondline inspection before rotor blade 106 is assembled, permitting a smooth, undisturbed aerodynamic blade surface that reduces or eliminates blade surface erosion. After rotor blade 106 is cured and machined to final shape, weight package 306 is inserted and attached to weight box 302. The weights included in weight package 306 may be adjusted to span-balance a rotor system such as rotor system 104 or tail rotor 110, or it may be used to chord-balance an individual rotor blade, such as rotor blade 106 or a blade of tail rotor 110.

The embodiments illustrated are only examples of the present invention. In another embodiment, a weight box could be shorter and wider than weight box 302 as illustrated and installed in a spar cutout oriented such that the long dimension runs chordwise, rather than spanwise, allowing balance weights to be placed further outboard in a rotor blade.

FIG. 8 shows a side view of part of an embodiment of the invention herein. Balancing system 300 is shown with weight box 302 with weight-box retention pin 304, weight package 306, weight-box cover 308, weight-package retention devices 310, weight-package retention rod 312, weight guide-rods 314, dynamic-balance weights 316, and weight-retention devices 318. Weight-box lip 320, weight-box outer surface 322, and weight-box contact surfaces 328 are shown.

FIG. 9 shows a side view of an embodiment of the invention herein. In this view, weight box 302 is rendered partly transparent to show one or more span-balance weights 337 mounted on the weight guide-rods 314 on the inboard side of weight-box cover 308 and retained on the weight guide-rods 314 with weight-retention devices 318 inside weight box 302. In this embodiment, weight package 306 includes span-balance weights 337. Span-balance weights 337 may substantially fill the interior of weight box 302 chordwise and from upper inner to lower inner surface, reducing or eliminating movement or bending of the weight guide-rods 314. Both the span-balance weights 337 and dynamic-balance weights 316 may be of varying thicknesses and materials to allow fine-tuned adjustments through selection and arrangement. Weight-box lip 320, weight-box outer surface 322, and weight-box contact surfaces 328 are shown.

Span-balance weights 337 and dynamic-balance weights 316 and their placement on weight guide-rods 314 as described decouple span balance from dynamic balance. Dynamic balance adjustments for rotor blade 106 may be made through rotor-blade tip 332 (not shown) without removing weight package 306 from rotor blade 106.

Figure 10:
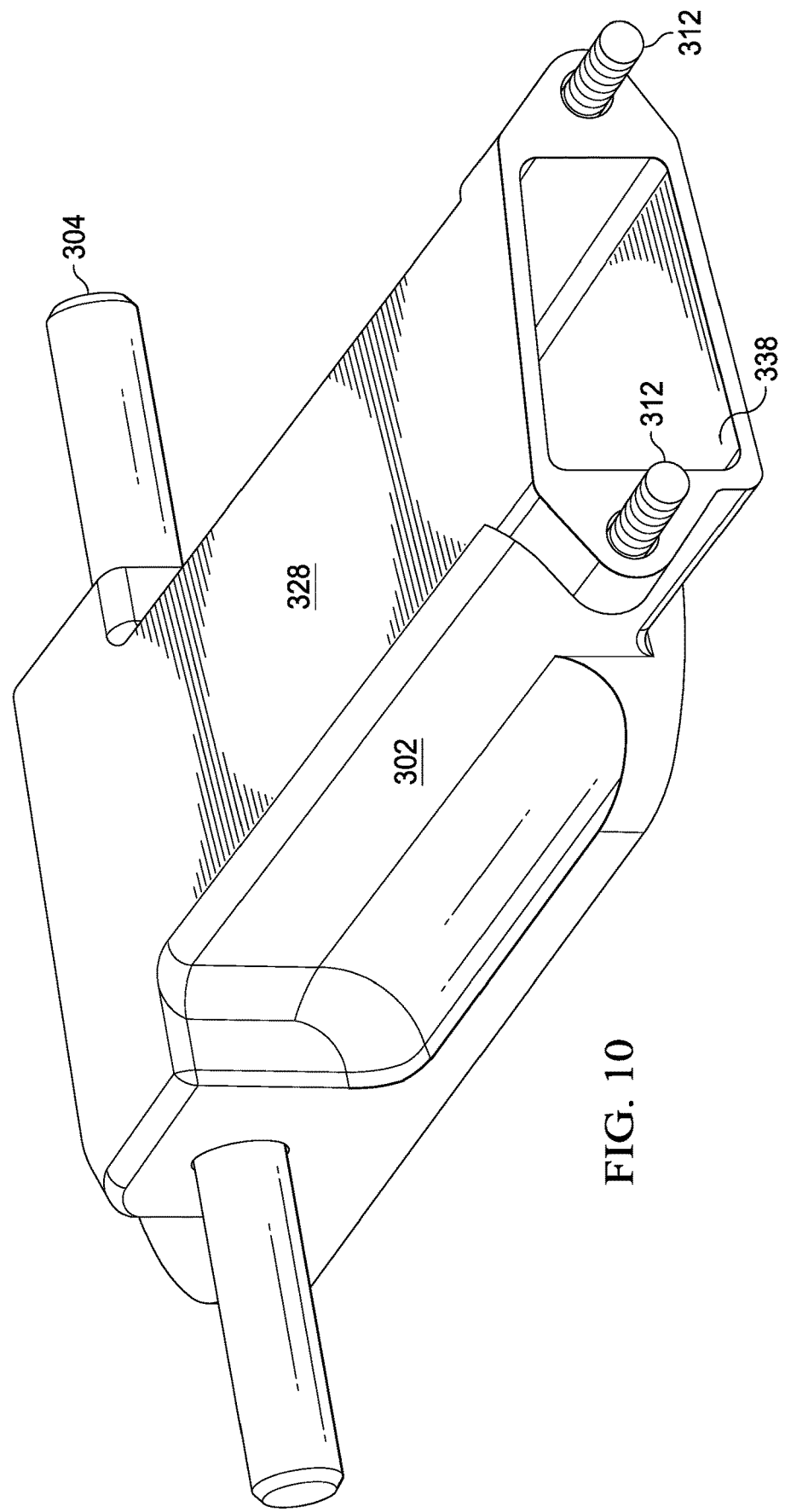
FIG. 10 shows a perspective view of an embodiment of the present invention, including a weight box and a weight-box contact surface.

FIG. 10 shows a perspective view of the upper side of part of an embodiment of the invention herein. Some components of balancing system 300 are omitted for clarity. Weight box 302 is shown without weight package 306 (not shown) attached. Weight-box retention pin 304 and weight-box contact surface 328 are shown. Without weight package 306 attached, weight-box opening 338 is shown. Weight guide-rods 314 (not shown) and span-balance weights 337 (not shown) fit into weight-box opening 338 when weight package 306 is attached to weight box 302. Weight-package retention rods 312, together with weight-package retention devices 310 (not shown), are used to retain weight-box cover 308 (not shown) of weight package 306 (not shown) to weight box 302.

Figure 11:
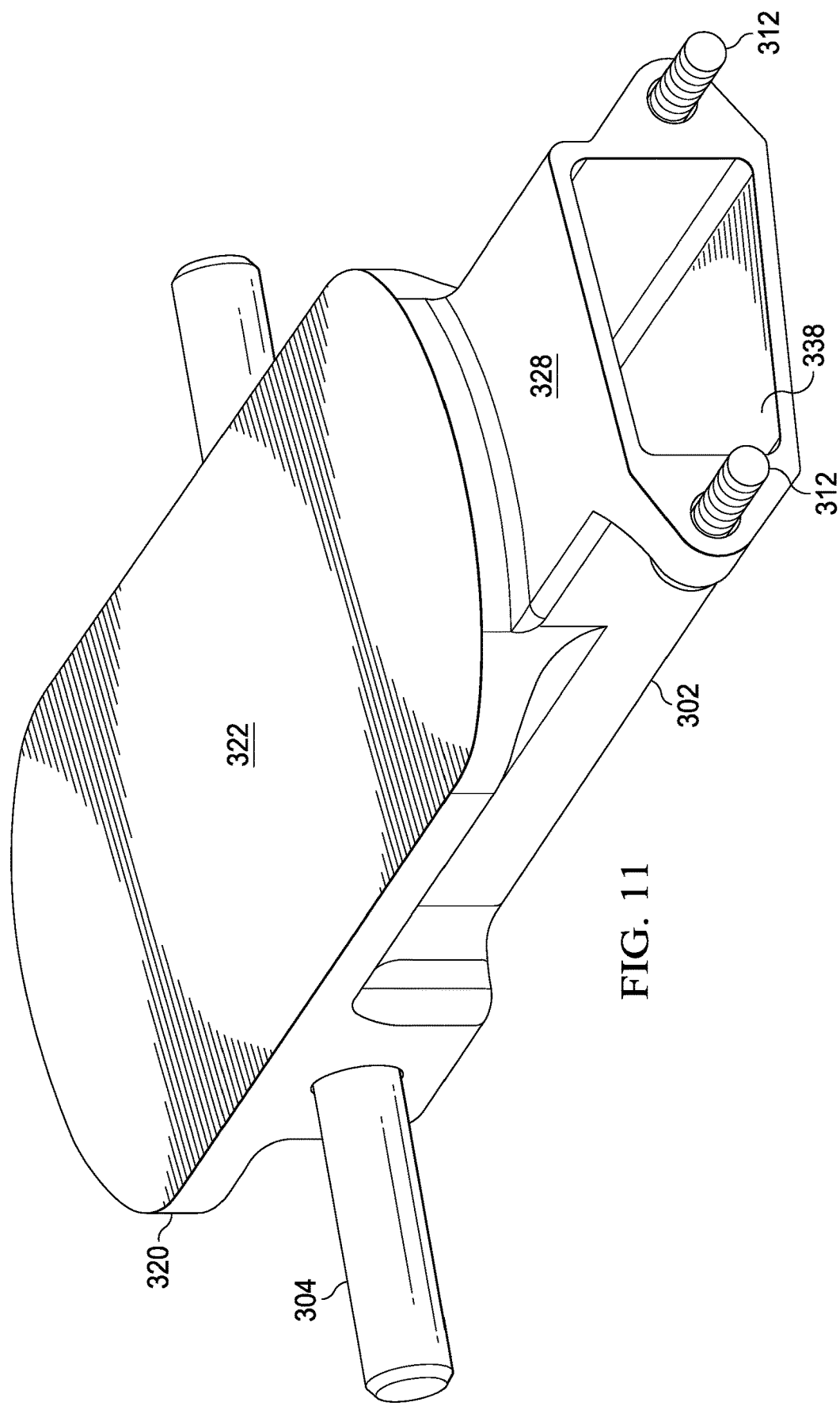
FIG. 11 shows a perspective view of an embodiment of the present invention, including a weight box, a weight-box retention pin, a weight-box contact surface.

FIG. 11 shows a perspective view of the upper side of part of an embodiment of the invention herein. Some components of balancing system 300 are omitted for clarity. Weight box 302, weight-box retention pin 304, weight-box contact surface 328, weight-box opening 338, and weight-package retention rods 312 are shown. Weight-box lip 320 and weight-box outer surface 322 are also shown.

Figure 12:
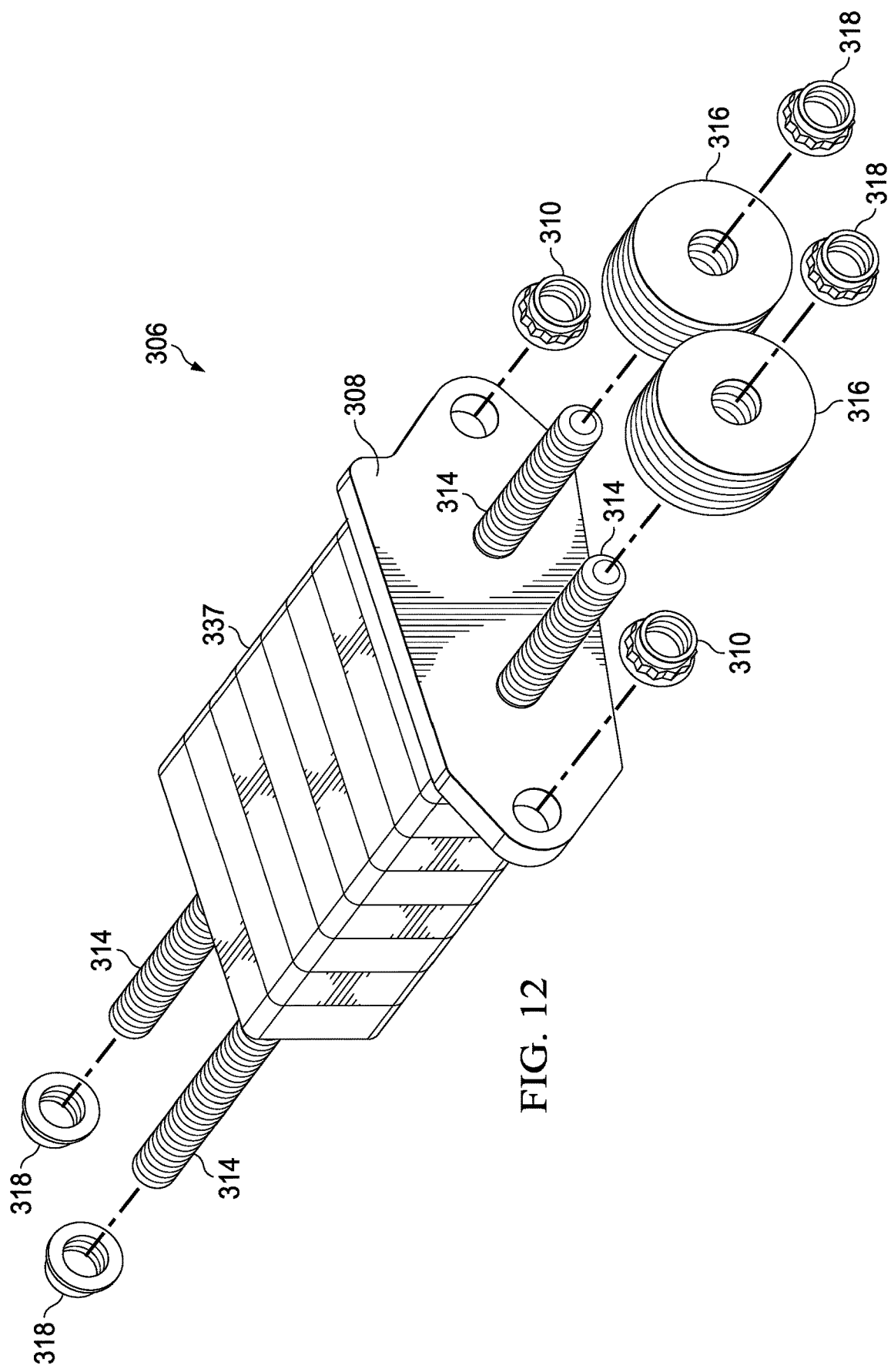
FIG. 12 shows an exploded view of an embodiment of the present invention, including a weight package, a weight-box cover, dynamic-balance weights, and span-balance weights.

FIG. 12 shows an exploded view of part of an embodiment of the invention herein. Components of weight package 306 are shown: weight-box cover 308, weight-package retention devices 310, weight guide-rods 314, dynamic-balance weights 316, span-balance weights 337, and weight-retention devices 318.

Figure 13:
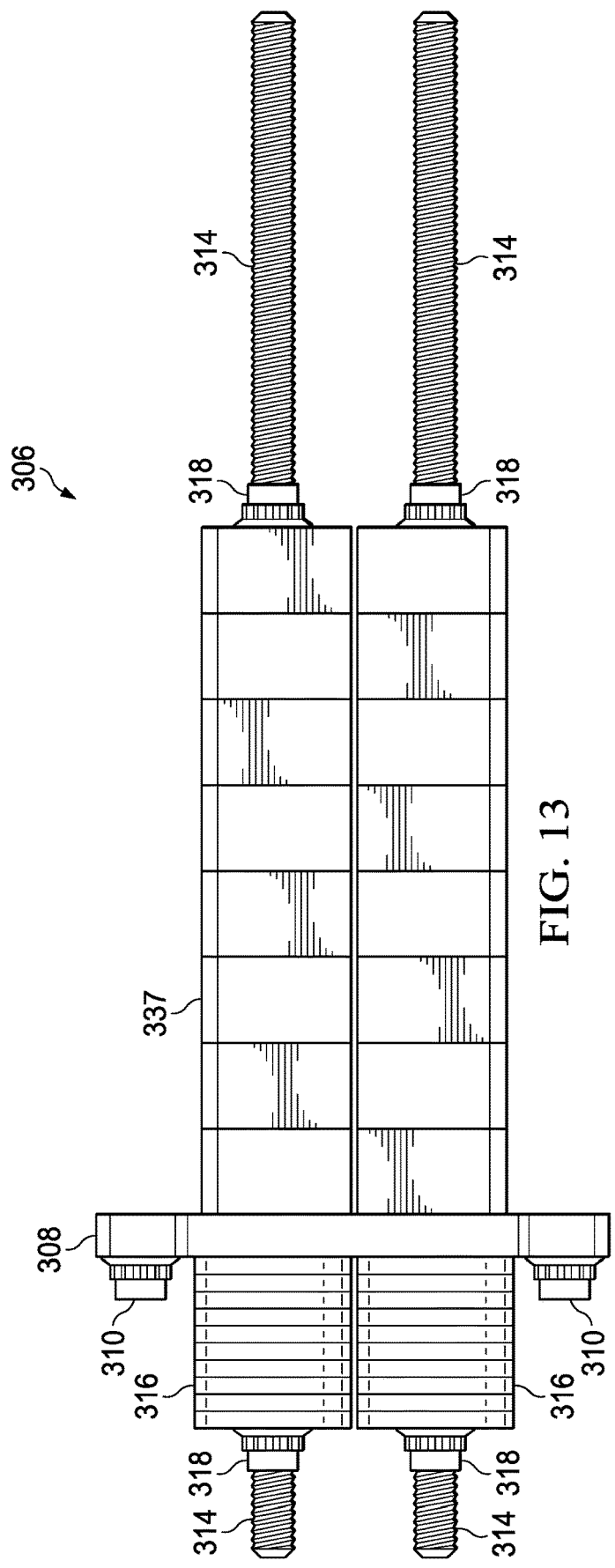
FIG. 13 shows a top view of an embodiment of the present invention, including a weight package, a weight-box cover, dynamic-balance weights, and span-balance weights.

FIG. 13 shows a top view of part of an embodiment of the invention herein. Components of weight package 306 are shown: weight-box cover 308, weight-package retention devices 310, weight guide-rods 314 dynamic-balance weights 316, span-balance weights 337, and weight-retention devices 318.

Figure 14:
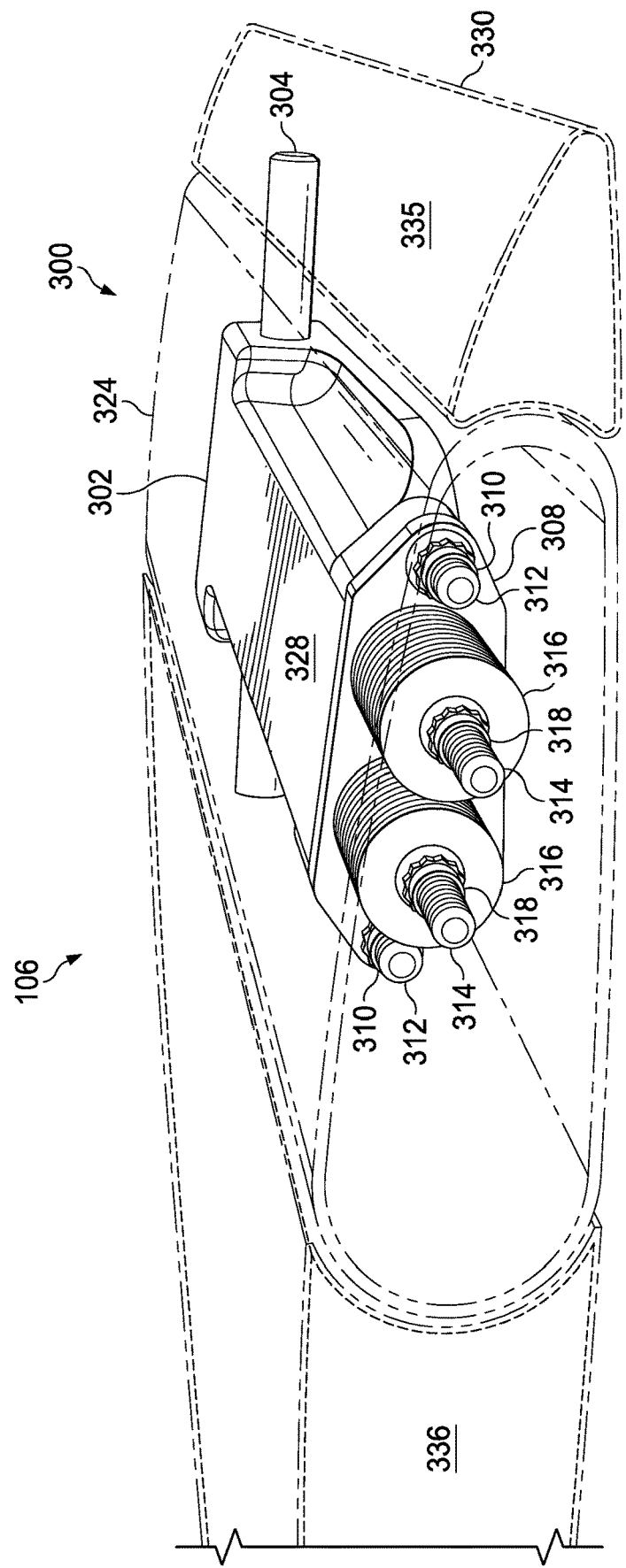
FIG. 14 shows a perspective view of an embodiment of the present invention, including a weight box, a weight-box retention pin, a weight-box contact surface, a weight package, a weight-box cover, and dynamic-balance weights.

FIG. 14 shows a perspective view of an embodiment of the present invention. Balancing system 300 is shown installed in rotor-blade spar 324 inside rotor blade 106, viewed from the upper outboard side. Rotor blade 106 is rendered partly transparent to show balancing system 300 within rotor blade 106. Visible in this view are weight box 302, weight-box retention pin 304, weight-box cover 308, weight-package retention devices 310, weight-package retention rods 312, weight guide-rods 314, dynamic-balance weights 316, weight-retention devices 318, weight-box contact surface 328, leading edge 330, leading-edge tuning weight 335, and blade core 336.

Figure 15:
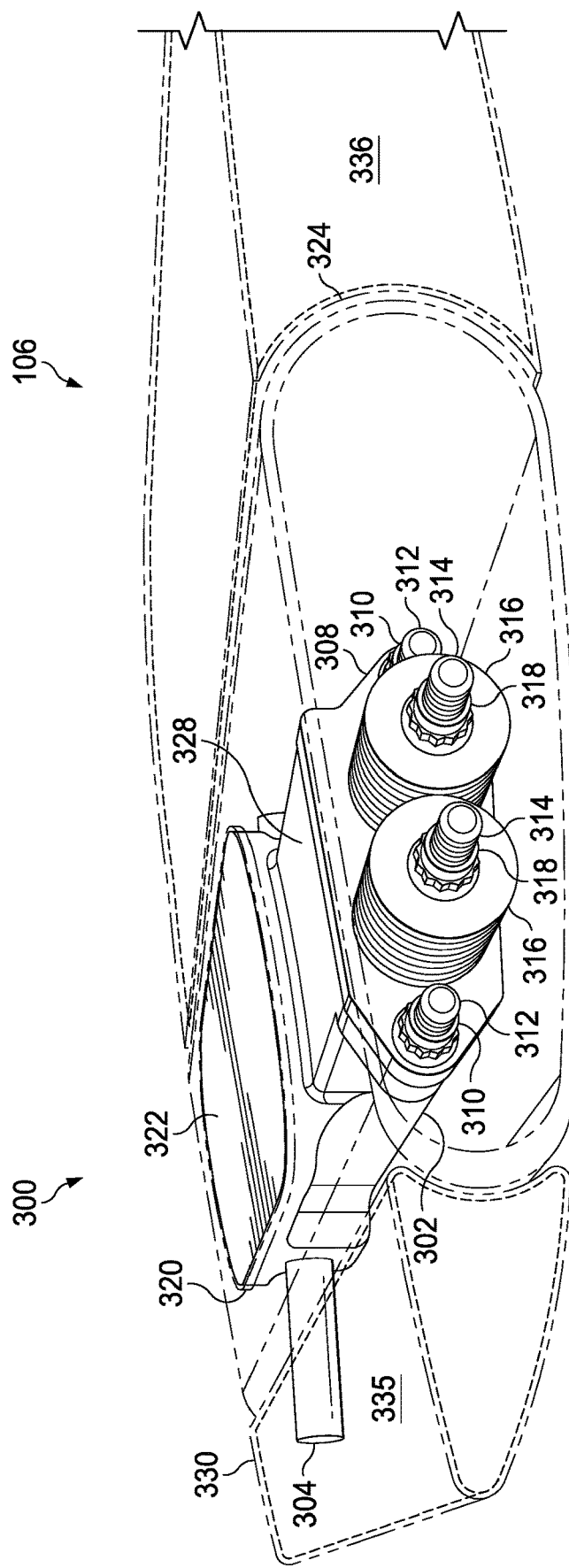
FIG. 15 shows a perspective view of an embodiment of the present invention, including a weight box, a weight-box retention pin, a weight-box contact surface, a weight package, a weight-box cover, and dynamic-balance weights.

FIG. 15 shows a perspective view of an embodiment of the present invention. Balancing system 300 is shown installed in rotor-blade spar 324 inside rotor blade 106, viewed from the lower outboard side. Rotor blade 106 is rendered partly transparent to show balancing system 300 within rotor blade 106. Visible in this illustration are weight box 302, weight-box retention pin 304, weight-box cover 308, weight-package retention devices 310, weight-package retention rods 312, weight guide-rods 314, dynamic-balance weights 316, weight-retention devices 318, weight-box lip 320, weight-box outer surface 322, weight-box contact surface 328, leading edge 330, leading-edge tuning weight 335, and blade core 336.

Figure 16:
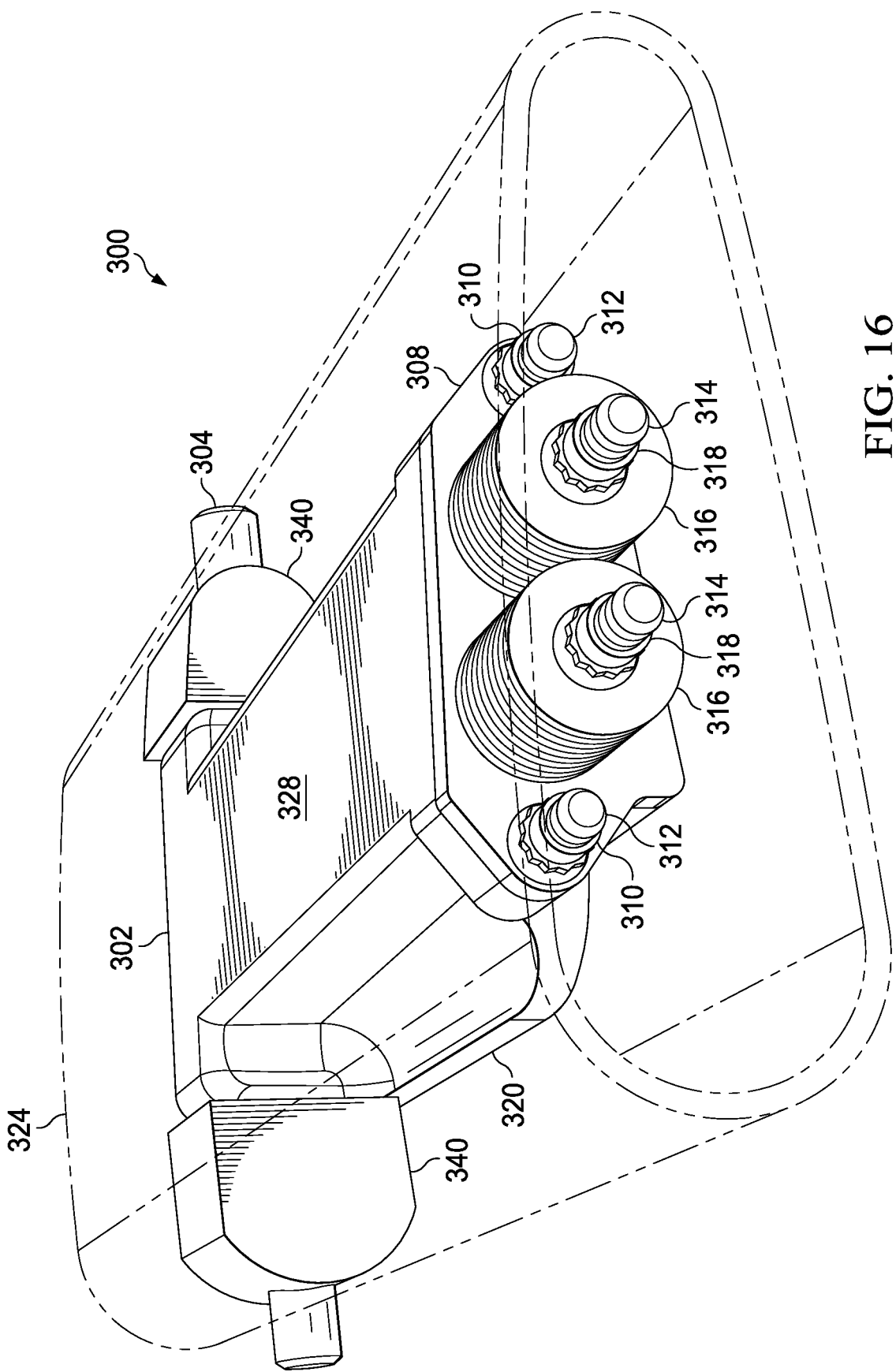
FIG. 16 shows a perspective view of an embodiment of the present invention, including a weight box, a weight-box retention pin, a weight-box contact surface, a weight package, a weight-box cover, dynamic-balance weights, and pin spacers.

FIG. 16 shows a perspective view of an embodiment of the present invention. Balancing system 300 is shown installed in rotor-blade spar 324, viewed from the upper outboard side. Rotor-blade spar 324 is rendered partly transparent to show balancing system 300 within rotor-blade spar 324. Visible in this view are weight box 302, weight-box retention pin 304, weight-box cover 308, weight-package retention devices 310, weight-package retention rods 312, weight guide-rods 314, dynamic-balance weights 316, weight-retention devices 318, and weight-box lip 320.

Continuing reference to FIG. 16, two pin spacers 340 are shown on either side of weight box 302 with weight-box retention pin 304 inserted through the two pin spacers 340 and weight box 302. One pin spacer 340 is positioned near weight-box retention pin 304 between the forward wall of rotor-blade spar 324 and weight box 302, and the other pin spacer 340 is positioned near weight-box retention pin 304 between the aft wall of rotor-blade spar 324 and weight box 302. Pin spacers 340 may be shaped to substantially fill an interior space of the weight box 302 from a weight-box upper inner surface to a weight-box lower inner surface and from a weight-box forward inner surface to a weight-box aft inner surface, as shown, to reduce or eliminate bending stresses experienced by weight-box retention pin 304.

Figure 17:
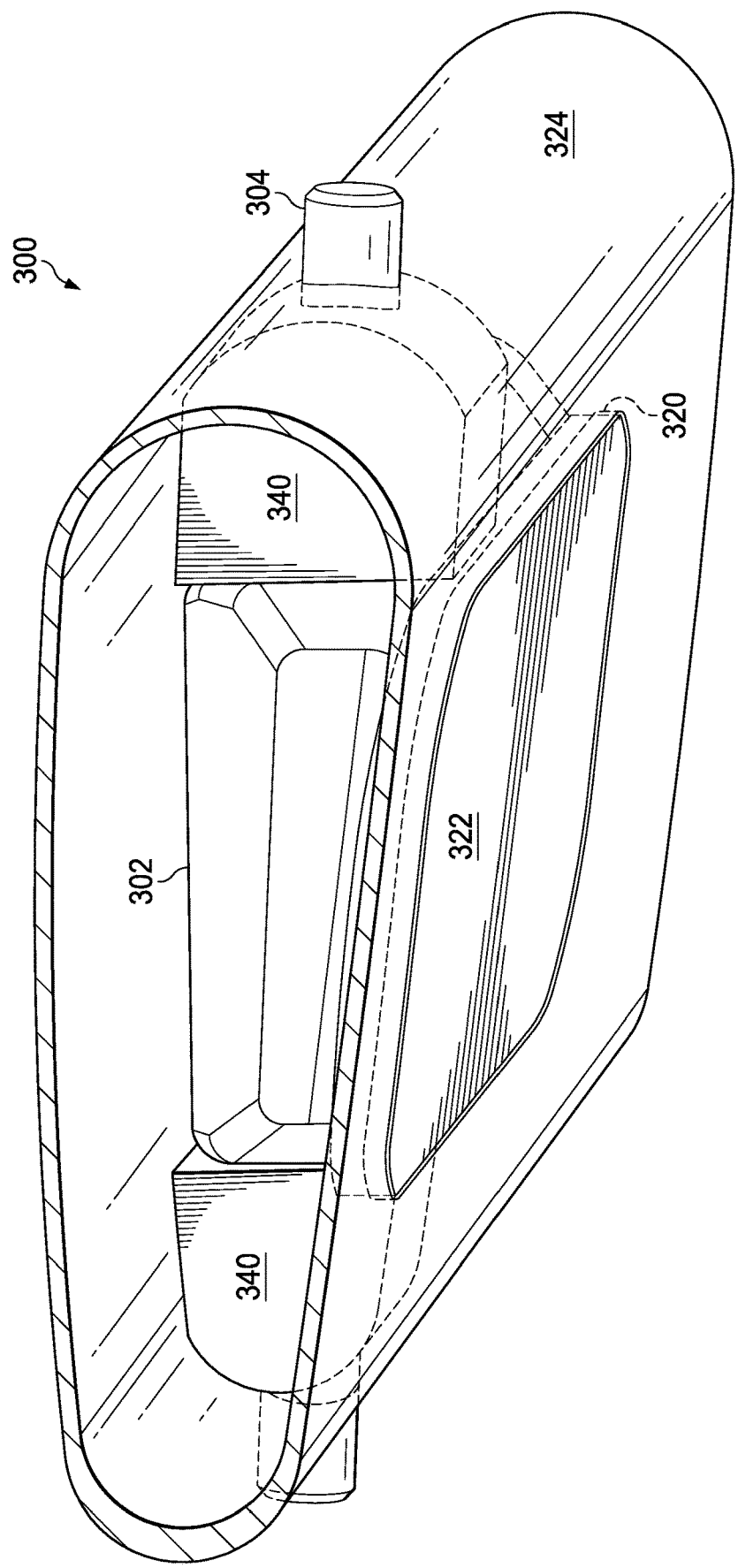
FIG. 17 shows a perspective view of an embodiment of the present invention, including a weight box, a weight-box retention pin, and pin spacers.

FIG. 17 shows a perspective view of an embodiment of the present invention. Balancing system 300 is shown installed in rotor-blade spar 324, viewed from the lower inboard side. Rotor blade 106 is rendered partly transparent to show balancing system 300 within rotor blade 106. Visible in this view are weight box 302, weight-box retention pin 304, and weight-box lip 320. In addition, in this embodiment, two pin spacers 340 are shown on either side of weight box 302 with weight-box retention pin 304 inserted through the two pin spacers 340 and weight box 302.

Figure 18:
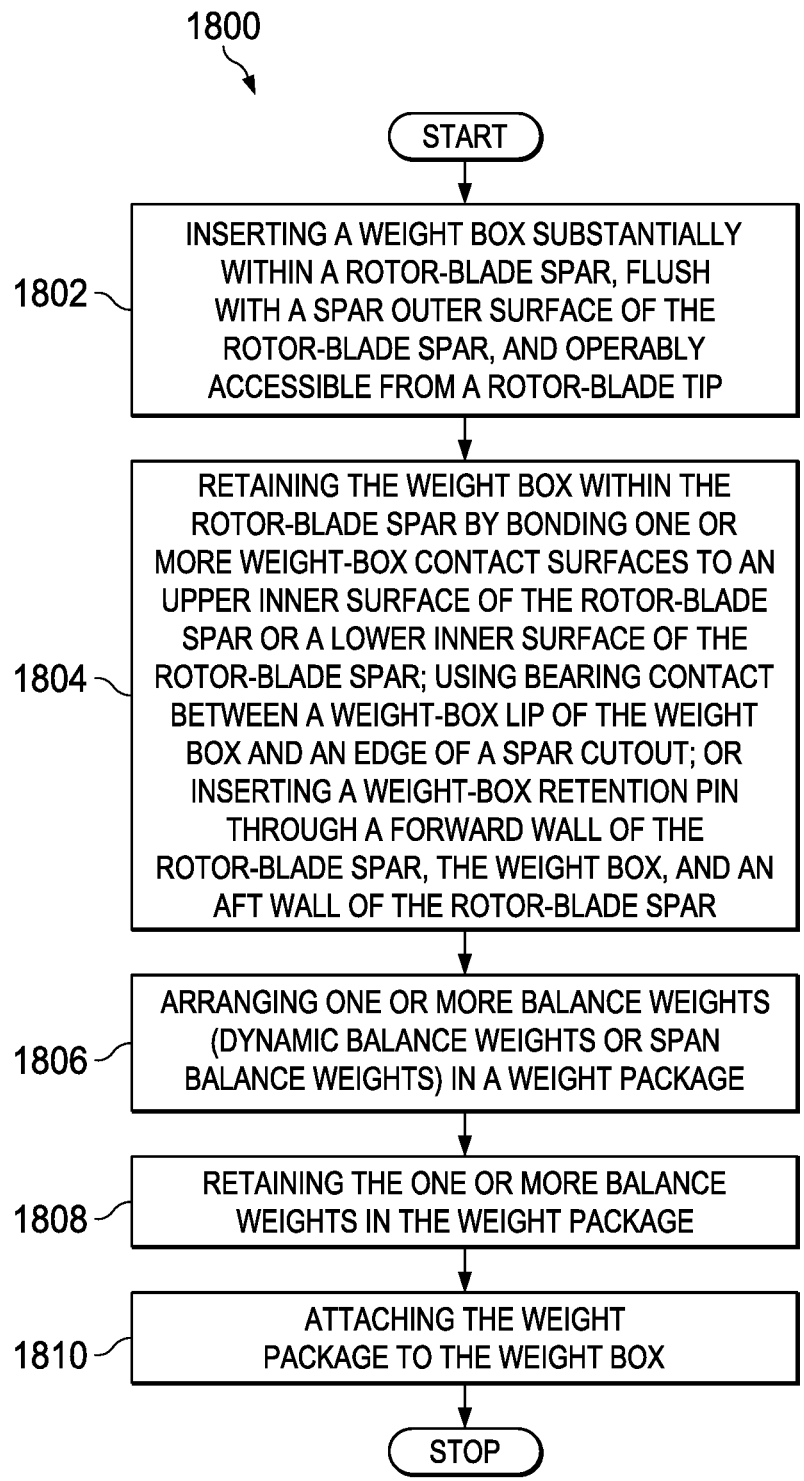
FIG. 18 shows a flowchart of an embodiment of the present invention.

FIG. 18 shows a flowchart of an embodiment of the present invention. A method of balancing weights 1800 starts with step 1802, inserting a weight box 302 substantially within a rotor-blade spar 324 of a rotor blade 106, flush with a spar outer surface 326 of the rotor-blade spar 324, and operably accessible from a rotor-blade tip 332. Method 1800 continues with step 1804, retaining the weight box 302 within the rotor-blade spar 324 by (1) bonding one or more weight-box contact surfaces 328 to an upper inner surface of the rotor-blade spar 324 or a lower inner surface of the rotor-blade spar 324, (2) using bearing contact between a weight-box lip 320 of the weight box 302 and an edge of spar cutout 325, or (3) inserting a weight-box retention pin 304 through a forward wall of the rotor-blade spar 324, the weight box 302, and an aft wall of the rotor-blade spar 324. Method 1800 continues with step 1806, arranging one or more balance weights in a weight package 306. Method 1800 continues with step 1808, retaining the one or more balance weights, dynamic-balance weights 316 or span-balance weights 337, in the weight package 306. Method 1800 continues with step 1810, attaching the weight package 306 to the weight box 302.

FIGS. 19A-19B show a side views of an embodiment 1900 and 1950 of the invention herein. In this view, weight box 302 is rendered partly transparent to show one or more span-balance weights 337 mounted on the weight guide-rods 314 on the inboard side of weight-box cover 308 and retained on the weight guide-rods 314 with weight-retention devices 318 inside weight box 302. In these embodiments, weight package 306 includes span-balance weights 337 and lightweight spacers 1902. The one or more lightweight spacers 1902 are mounted on at least one weight guide-rod 314, to take up space if necessary, depending on the design of weight guide-rods 314 or the distribution of balance weights among weight guide-rods 314. For example and as shown in FIG. 19A, the span-balance weights 337 and lightweight spacers 1902 can be intermixed to distribute the weight as desired. In another example as shown in FIG. 19B, the lightweight spacers 1902 can be placed at either end of the span-balance weights 337 or both ends of the span-balance weights 337. Span-balance weights 337 and lightweight spacers 1902 may substantially fill the interior of weight box 302 chordwise and from upper inner to lower inner surface, reducing or eliminating movement or bending of the weight guide-rods 314. Both the span-balance weights 337, lightweight spacers 1902 and dynamic-balance weights 316 may be of varying thicknesses and materials to allow fine-tuned adjustments through selection and arrangement. Weight-box lip 320, weight-box outer surface 322, and weight-box contact surfaces 328 are shown.

The skilled artisan will recognize that the novel balancing system 300 of the present invention provides systems and methods for installing balancing weights in a rotor blade 106 or other rotor blades that does not require fasteners in a rotor-blade surface or holes in electrical heating elements, metal abrasion strips, erosions caps, or other rotor components, aside from the rotor-blade spar 324, improving aerodynamic performance, reducing opportunities for erosion and wear, an making balancing weights more accessible for adjustment.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components.

The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A balancing system, comprising:
   a weight box, the weight box comprising a weight-box retention pin, the weight box mounted substantially within a rotor-blade spar, flush with a spar outer surface of the rotor-blade spar, operably accessible from a rotor-blade tip, and retained within the rotor-blade spar by:
   the weight-box retention pin inserted through a forward wall of the rotor-blade spar, the weight box, and an aft wall of the rotor-blade spar,
   one or more weight-box contact surfaces bonded to an upper inner surface of the rotor-blade spar or a lower inner surface of the rotor-blade spar, and
   a weight-box lip positioned to provide a bearing contact with an edge of a spar cutout of the rotor-blade spar; and
   a weight package attached to the weight box, the weight package comprising:
   a weight-box cover attached to the weight box;
   two or more weight guide-rods attached to the weight-box cover, wherein one of the two or more weight guide-rods is positioned forward of a pitch change axis or a center of twist and wherein one of the two or more weight guide-rods is positioned aft of the pitch change axis or the center of twist; and
   one or more balance weights mounted on at least one of the two or more weight guide-rods.

2. The system of claim 1, further comprising one or more weight-retention devices mounted on at least one of the two or more weight guide-rods to retain the one or more balance weights on the at least one of the two or more weight guide-rods.

3. The system of claim 2, wherein the one or more weight-retention devices are interference-fit to the one or more balance weights.

4. The system of claim 1, further comprising one or more pin spacers positioned near the weight-box retention pin and between the forward wall of the rotor-blade spar and the weight-box or the aft wall of the rotor-blade spar and the weight box.

5. The system of claim 1, wherein the weight-box cover is attached to the weight box with one or more weight-package retention devices.

6. The system of claim 5, wherein the one or more weight-package retention devices are interference-fit to the weight-box cover.

7. The system of claim 1, wherein the two or more weight guide-rods, each weight guide-rod having a threaded tip portion and a non-threaded shank portion or is threaded for substantially its entire length.

8. The system of claim 1, wherein the one or more balance weights comprise one or more span-balance weights or one or more dynamic-balance weights.

9. The system of claim 8, wherein the one or more span-balance weights are mounted on the two or more weight guide-rods on an inboard side of the weight-box cover.

10. The system of claim 9, wherein the one or more span-balance weights are shaped to substantially fill an interior space of the weight box from a weight-box upper inner surface to a weight-box lower inner surface and from a weight-box forward inner surface to a weight-box aft inner surface.

11. The system of claim 8, wherein the one or more dynamic-balance weights are mounted on the two or more weight guide-rods on an outboard side of the weight-box cover.

12. The system of claim 1, wherein the weight package further comprises one or more lightweight spacers mounted on at least one of the two or more weight guide-rods.

13. The system of claim 1, wherein the one or more balance weights are operably configurable to substantially provide span balance or chord balance.

14. The system of claim 1, wherein the weight-box retention pin locates or retains a leading-edge tuning weight.

15. The system of claim 1, wherein the weight-box retention pin locates a blade core.

16. The system of claim 1, wherein the rotor-blade spar is a main rotor-blade spar, a tail rotor-blade spar, a proprotor blade spar, a propeller blade spar, or a wind-turbine blade spar.

17. A rotor system, comprising:
at least one rotor blade;
a rotor-blade spar inside the at least one rotor blade;
a weight box, the weight box comprising a weight-box retention pin, the weight box mounted substantially within the rotor-blade spar, flush with a spar outer surface of the rotor-blade spar, operably accessible from a rotor-blade tip, and retained within the rotor-blade spar by:
the weight-box retention pin inserted through a forward wall of the rotor-blade spar, the weight box, and an aft wall of the rotor-blade spar,
one or more weight-box contact surfaces bonded to an upper inner surface of the rotor-blade spar or a lower inner surface of the rotor-blade spar, and
a weight-box lip positioned to provide a bearing contact with an edge of a spar cutout of the rotor-blade spar; and
a weight package attached to the weight box, the weight package comprising:
a weight-box cover attached to the weight box;
two or more weight guide-rods attached to the weight-box cover, wherein one of the two or more weight guide-rods is positioned forward of a pitch change axis or a center of twist and wherein one of the two or more weight guide-rods is positioned aft of the pitch change axis or the center of twist; and
one or more balance weights mounted on at least one of the two or more weight guide-rods.

18. The rotor system of claim 17, further comprising one or more weight-retention devices mounted on at least one of the two or more weight guide-rods to retain the one or more balance weights on the at least one of the two or more weight guide-rods.

19. A method of balancing weights in a rotor system, comprising:
inserting a weight box substantially within a rotor-blade spar of a rotor blade, flush with a spar outer surface of the rotor-blade spar, and operably accessible from a rotor-blade tip;
retaining the weight box within the rotor-blade spar by:
bonding one or more weight-box contact surfaces to an upper inner surface of the rotor-blade spar or a lower inner surface of the rotor-blade spar,
using a bearing contact between a weight-box lip of the weight box and an edge of a spar cutout, and
inserting a weight-box retention pin through a forward wall of the rotor-blade spar, the weight box, and an aft wall of the rotor-blade spar;
arranging one or more balance weights in a weight package;
retaining the one or more balance weights in the weight package; and
attaching the weight package to the weight box.

20. The method of claim 19, wherein the weight package comprises a weight-box cover; and
the arranging the one or more balance weights in the weight package further comprises:
attaching two or more weight guide-rods to the weight-box cover, attaching one of the two or more weight guide-rods forward of a pitch change axis or a center of twist and attaching one of the two or more weight guide-rods aft of the pitch change axis or the center of twist; and
arranging the one or more balance weights on the two or more weight guide-rods.

21. The method of claim 19, further comprising arranging the one or more balance weights, wherein the one or more balance weights comprise one or more span-balance weights.

22. The method of claim 19, further comprising arranging the one or more balance weights, wherein the one or more balance weights comprise one or more dynamic-balance weights.

23. The method of claim 19, further comprising retaining the one or more balance weights in the weight package with one or more retention devices interference-fit to the one or more balance weights.

24. The method of claim 19, further comprising attaching the weight package to the weight box with one or more retention devices interference-fit to the weight.

25. The method of claim 19, wherein the arranging the one or more balance weights in the weight package comprises arranging the one or more balance weights for span balancing the rotor system or arranging the one or more balance weights for chord balancing the rotor blade.

26. The method of claim 19, further comprising locating or retaining a leading-edge tuning weight with the weight-box retention pin.

27. The method of claim 19, further comprising locating a blade core with the weight-box retention pin.

28. The method of claim 19, further comprising inserting the weight box and the weight package substantially inside the rotor-blade spar, wherein the rotor-blade spar is a main rotor-blade spar, a tail rotor-blade spar, a proprotor blade spar, a propeller blade spar, or a wind-turbine blade spar.

29. A rotorcraft, comprising:
a fuselage;
one or more engines coupled to the fuselage; and
one or more rotor systems coupled to the one or more engines, each rotor system of the one or more rotor systems comprising at least one rotor blade comprising:
a rotor-blade spar inside the at least one rotor blade;
a weight box, the weight box comprising a weight-box retention pin, the weight box mounted substantially within the rotor-blade spar, flush with a spar outer surface of the rotor-blade spar, operably accessible from a rotor-blade tip, and retained within the rotor-blade spar by:
the weight-box retention pin inserted through a forward wall of the rotor-blade spar, the weight box, and an aft wall of the rotor-blade spar,
one or more weight-box contact surfaces bonded to an upper inner surface of the rotor-blade spar or a lower inner surface of the rotor-blade spar, and
a weight-box lip positioned to provide a bearing contact with an edge of a spar cutout of the rotor-blade spar; and
a weight package attached to the weight box, the weight package comprising:
a weight-box cover attached to the weight box;
two or more weight guide-rods attached to the weight-box cover, wherein one of the two or more weight guide-rods is positioned forward of a pitch change axis or a center of twist and wherein one of the two or more weight guide-rods is positioned aft of the pitch change axis or the center of twist; and
one or more balance weights mounted on at least one of the two or more weight guide-rods.

30. The rotorcraft of claim 29, further comprising one or more weight-retention devices mounted on at least one of the two or more weight guide-rods to retain the one or more balance weights on the at least one of the two or more weight guide-rods.

* * * * *